United States Patent [19]

Yoshimura

[11] Patent Number: 4,860,141
[45] Date of Patent: Aug. 22, 1989

[54] TAPE RECORDER OF THE CASSETTE TYPE
[75] Inventor: Toshio Yoshimura, Kawasaki, Japan
[73] Assignee: Tanashin Denki Co., Ltd., Japan
[21] Appl. No.: 108,428
[22] Filed: Oct. 14, 1987
[30] Foreign Application Priority Data
  May 2, 1987 [JP] Japan .............................. 62-66997[U]
[51] Int. Cl.$^4$ ............................................. G11B 15/60
[52] U.S. Cl. ................................................ 360/130.21
[58] Field of Search ........... 360/130.21, 130.2, 130.22, 360/130.23, 96.1, 96.2, 96.3, 96.4, 96.5

[56] References Cited
U.S. PATENT DOCUMENTS 3,619,625 11/1971 Wood .............................. 360/130.21
4,646,186 2/1987 Tsuchiya et al. ............... 360/130.21

Primary Examiner—John H. Wolff
Assistant Examiner—Matthew J. Bussan
Attorney, Agent, or Firm—Wegner & Bretschneider

[57] ABSTRACT

A cassette tape recorder wherein lateral widthwise movement of a tape can be limited to assure stabilized feeding of the tape and prevent eventual damage to the tape. The tape recorder comprises a pair of cassette guide posts securely mounted on a stationary main base plate, and a tape guide mounted on a movable head carrying plate and having an upper widthwise movement limiting projection and a lower shorter widthwise movement limiting projection formed respectively adjacent upper and lower ends of a tape contacting face thereof for limiting lateral widthwise movement of a tape being fed along the tape contacting face of the tape guide. At least one of the cassette guide posts which opposes to the tape guide has a tapering profile presenting a lower large diameter portion and an upper small diameter portion which are opposed respectively to the lower and upper widthwise controlling projections of the tape guide.

4 Claims, 2 Drawing Sheets

4,860,141

TAPE RECORDER OF THE CASSETTE TYPE

BACKGROUND OF THE INVENTION

1. Field of the Invention

This invention relates to a tape recorder of the cassette type which includes a cassette guide post for positioning a tape cassette loaded in the tape recorder and a tape guide mounted for movement toward and away from the cassette guide.

2. Description of the Prior Art

Generally, in a tape recorder of the cassette type, a reel driving shaft, a cassette guide post and a capstan is located on a stationary main base plate of the tape recorder. Meanwhile, a tape reel, a positioning hole and a capstan hole are located or formed in a tape cassette to be loaded on a tape recorder. When a cassette is loaded in position on a tape recorder, the tape reel, positioning hole and capstan hole of the cassette are fitted respectively on the reel driving shaft, cassette guide post and capstan on the main base plate.

Further, the main base plate has a head carrying plate mounted thereon for movement toward and away from a cassette loaded in position on the tape recorder, and a recording/reproducing head, an erasing head and a tape guide are carried on the carrying plate. A pinch roller is also mounted on the main base plate and is moved into and out of contact with the capstan as the head carrying plate moves back and forth.

Thus, when the tape recorder is in a reproducing mode, the recording/reproducing head is contacted with a tape while the tape is held between the pinch roller and the capstan so that the tape is fed at a fixed speed by rotation of the capstan.

An arrangement of a tape guide and a guide post of an exemplary one of conventional tape recorders is illustratively shown in FIG. 3. Referring to FIG. 3, a cassette guide post 1 for receiving a tape cassette thereon is securely mounted on a stationary main base plate 2 and has a so-called tapering profile wherein a lower half has a cylindrical shape of a fixed diameter and a upper half has a substantially conical shape and is thus tapered toward an upper end thereof in order that a tape cassette may be smoothly received thereon.

A tape guide 3 is mounted in an opposing relationship to the cassette guide post 1 and for movement toward and away from the cassette guide post 1. In particular, the tape guide 3 is mounted on a head carrying plate 4 which is in turn mounted for movement toward and away from a tape cassette not shown loaded in position on the tape recorder. Accordingly, as the head carrying plate 4 moves toward and away from the cassette in position, the tape guide 3 is also moved toward and away from the cassette guide post 1.

The tape guide 3 has a tape contacting face 5 formed at an end thereof opposing the tape cassette in position in a parallel relationship to a plane of a tape being fed in the tape cassette. The tape guide 3 further has a pair of widthwise movement limiting portions or guide portions 6a, 6b in the form of rounded projections formed at upper and lower ends of the tape contacting face 5 thereof for limiting lateral widthwise movement of a magnetic tape to be fed along the tape contacting face 5. Thus, if the head carrying plate 4 is moved to a tape reproducing position nearest to the cassette guide post 1, a magnetic tape T within a tape cassette loaded in position on the tape recorder is slidably contacted with the tape contacting face 5 of the tape guide 3.

Then, during reproduction of the tape T, the lateral widthwise movement of the tape is limited or restranied by the upper and lower widthwise movement limiting portions 6a, 6b. Besides, the tape guide 3 has an additional function to stabilize, particularly where the tape recorder is of the automatic reversing type, vertical or lateral widthwise positions of the tape at left- and right-hand side positions with respect to a magnetic head not shown thereby to stabilize the crosstalk and separation between the tape and the head. In addition, the tape contacting face 5 of the tape guide 3 functions to provide a load to cause a back tension to act upon the tape due to a load caused by its sliding contact by the tape. Such a back tension acts to contact the tape closely with the tape contacting face of the head.

However, in the conventional tape recorder, the widthwise movement limiting portions 6a, 6b of the tape guide 3 have an equal extension from the tape contacting face 5. Besides, since the cassette guide post 1 and the tape guide 3 are located in an opposing relationship as described hereinabove, the extension of the widthwise movement limiting portions 6a, 6b from the tape contacting face 5 is relatively short so that the lower widthwise movement limiting portion 6b may not contact with the cassette guide post 1 when the head carrying plate 4 is in its tape reproducing position nearest to the cassette guide post 1. Accordingly, the conventional tape recorder has following problems.

In particular, when a temporary fast feeding operation (cuing operation) or a temporary rewinding operation (reviewing operation) is performed in the reproduction mode of the tape recorder, the head carrying plate 4 is retracted a little distance from its reproduction mode position, and the recording/reproducing head, tape guide 3 and pinch roller are moved away from the tape together with the head carrying plate 4. In this instance, if the retracting movement of the head carrying plate 4 proceeds slowly, then the tape will be fed at a high speed by rotation of a winding side reel driving shaft because the contacting pressure of the pinch roller reduces at a stage before the pinch roller is moved completely away from the capstan. Since the distribution of the contacting pressure of the pinch roller against the capstan over the axis of the capstan at this point of time is very unstable, the tape tends to move toward a location at which the pinch roller is contacted at a relatively high pressure with the capstan. Besides, since the tape guide 3 is at its retracted position at this point of time, the function of the tape guide 3 to prevent lateral widthwise movement of the tape does not operate sufficiently.

Consequently, the tape may move in a lateral widthwise direction. However, there will be no trouble if the tape moves toward the base end of the capstan. But on the contrary if the tape moves toward the free end of the capstan, there is the possibility that the tape may drop off the free end of the capstan and come around to the opposite side of the capstan remote from the pinch roller.

If this actually occurs, then the tape cannot be fed in a regular manner. Accordingly, the tape may be damaged or else twisted around itself.

SUMMARY OF THE INVENTION

Accordingly, it is an object of the present invention to provide a tape recorder of the cassette type wherein lateral widthwise movement of a tape can be limited to assure stabilized feeding of the tape and prevent possible damage to the tape even when a temporary fast feeding operation or a temporary rewinding operation is performed.

In order to attain the object, according to the present invention, there is provided a tape recorder of the cassette type which includes a stationary main base plate, a pair of cassette guide posts securely mounted at base ends thereof on the main base plate for receiving a tape cassette thereon, a head carrying plate mounted for movement toward and away from a tape cassette received in position on the cassette guide posts, a magnetic head mounted at a location of the head carrying plate between the cassette guide posts on the main base plate, and a tape guide mounted on the head carrying plate upstream of the head along a feeding passage of a magnetic tape in the tape cassette, the tape guide having a tape contacting face for contacting with the tape and a pair of upper and lower widthwise movement limiting portions formed adjacent upper and lower ends of the tape contacting face for limiting lateral widthwise movement of the tape being fed along the tape contacting face of the tape guide, wherein one of the cassette guide posts has a tapering profile presenting a lower large diameter portion and an upper small diameter portion while the upper widthwise movement limiting portion of the tape guide has a greater extension from the tape contacting face than the lower widthwise movement limiting portion, and the tape guide is located such that the upper widthwise movement limiting portion thereof opposes to the small diameter portion of the one cassette guide post while the lower widthwise movement limiting portion thereof opposes to the large diameter portion of the one cassette guide post.

With the construction of the tape recorder described above, even if the distribution of the contacting pressure of the pinch roller against the capstan over the axis of the capstan becomes unstable during retracting movement of the head carrying plate upon, for example, temporary fast feeding operation or temporary rewinding operation, the function of the tape guide to prevent lateral widthwise upward and downward movement of the tape does not become ineffective until after the pinch roller is completely moved away from the capstan because the upper widthwise movement limiting portion is projected longer than the lower widthwise movement limiting portion. Accordingly, at least upward movement of the tape is prevented, thereby preventing eventual dropping of the tape off the capstan. Consequently, stabilized feeding of the tape can be assured and eventual damage to the tape can be prevented.

The above and other objects, features and advantages of the present invention will become apparent from the following description and the appended claims, taken in conjunction with the accompanying drawing.

DESCRIPTION OF THE PREFERRED EMBODIMENTS

Figure 1:
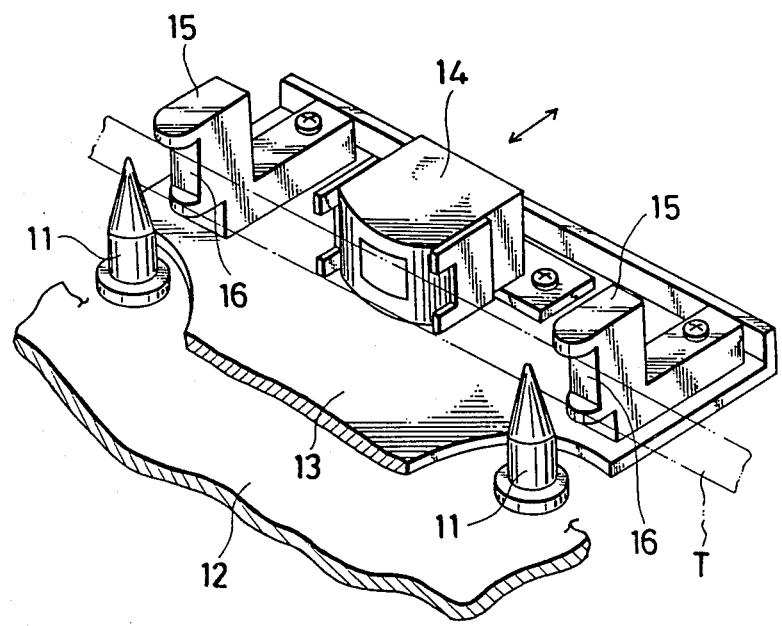
FIG. 1 is a perspective view of part of a tape recorder of the cassette type showing an embodiment of the present invention.

Referring first to FIG. 1, there is shown a tape recorder of the cassette type according to a preferred embodiment of the present invention. The tape recorder shown is of the automatic reversing type and includes a pair of cassette guide posts 11 securely mounted on a stationary main base plate 12. The cassette guide posts 11 are formed so as to have a tapering profile wherein a lower half 11b has a cylindrical shape of a fixed diameter while an upper half 11a has a substantially conical shape and is thus tapered so that it may reduce in thickness toward an upper end thereof as seen more clearly in FIG. 2. The cassette guide posts 11 are adapted to be fitted into positioning holes not shown formed in a tape cassette not shown in order to allow the cassette to be loaded in position on the tape recorder.

A head carrying plate 13 is mounted on the main base plate 12 for movement toward and away from a tape cassette loaded in position on the tape recorder. A recording/reproducing head 14 and an erasing head not shown are carried on the head carrying plate 13. A pair of tape guide 15 are mounted at symmetrical locations of the head carrying plate 13 with respect to the recording/reproducing head 14 such that forward ends thereof may oppose to the cassette guide posts 11. A pair of pinch rollers not shown are mounted at locations of the main base plate 12 outside the tape guide 15 and are moved into and out of contact with a pair of left and right capstans not shown as the head carrying plate 13 moves back and forth toward and away from the tape cassette in position.

Figure 2:
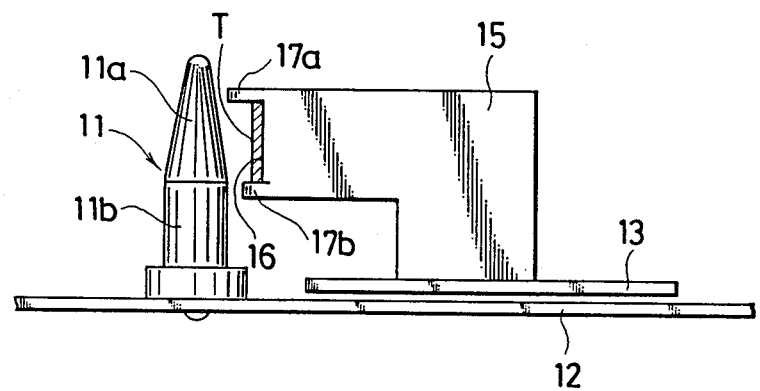
FIG. 2 is partial schematic side elevational view, in a somewhat enlarged scale, of the tape recorder of FIG. 1.
Figure 3:
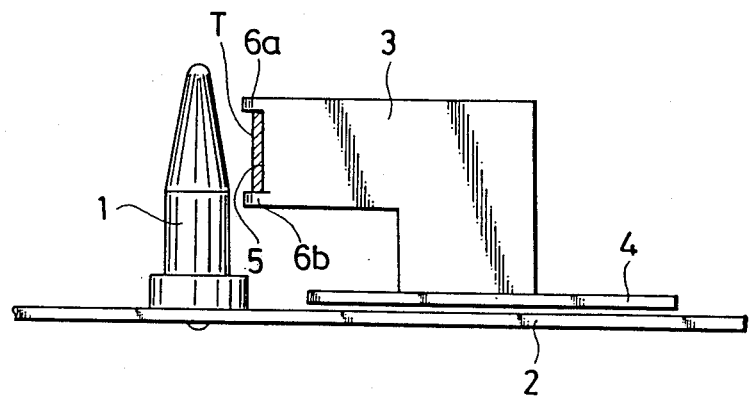
FIG. 3 is a similar view but showing a conventional tape recorder.

Referring to FIG. 2, each of the tape guides 15 has a tape contacting face 16 formed at an end thereof opposing to the corresponding tape guide post 11 in a parallel relationship to a plane of a magnetic tape T being fed on the tape recorder. A pair of upper and lower widthwise movement limiting portions or guide portions 17a, 17b in a form of rounded projections for limiting lateral widthwise movement of a tape T being fed are formed at upper and lower ends, respectively, of the tape contacting face 16 of each of the tape guides 15 and extend horizontally forwardly in a parallel relationship to each other. The upper widthwise movement limiting portion 17a had a greater extension from the tape contacting face 16 than the lower widthwise movement limiting portion 17b as clearly seen in FIG. 2, and the upper widthwise movement limiting portion 17a is opposed to the conical or smaller diameter portion 11a of the corresponding cassette guide post 11 while the lower widthwise movement limiting portion 17b is opposed to the cylindrical or greater diameter portion 11b of the corresponding cassette guide post 11.

When the tape recorder having such a construction as described above is, for example, in the reproduction mode so that the recording/reproducing head 14 is in contact with a magnetic tape T in a tape cassette loaded in position on the tape recorder, the widthwise movement limiting portions 17a, 17b assume their positions nearest to the opposing cassette guide posts 11. In this instance, although the upper widthwise movement limiting portions 17a of the tape guides 15 have a greater extension from the tape contacting faces 16 than the lower widthwise movement limiting portions 17b, the tape guides 15 will not be contacted at any portions thereof with the opposing guide posts 11 because the upper and lower widthwise movement limiting portions 17a, 17b are opposed to the smaller and larger diameter portions 11a, 11b of the cassette guide posts 11, respectively. Meanwhile, if an FF button or a REW button is depressed to effect a temporary fast feeding operation or a temporary rewinding operation when the tape recorder is in the reproduction mode, the head carrying plate 13 is retracted with respect to the cassette in position so that the pinch roller, recording/reproducing head 14 and tape guide 15 are retracted a little distance from the tape T. Thereupon, at least forward end portions of the upper widthwise movement limiting portions 17a remain located inside of the plane of the tape T being fed, that is, located on the cassette guide post 11 side with respect to the tape feeding plane. As a result, if the distribution of the contacting pressure of the pinch roller against the capstan over the entire width of the capstan becomes unstable at a stage before the pinch roller is completely moved away from the captstan when a temporary fast feeding operation or a temporary rewinding operation is performed, at least upward movement of the tape T, that is, lateral widthwise movement toward the upper end of the capstan, is limited by the widthwise movement limiting portions 17a. Consequently, stabilized feeding of the tape is assured and possible damage to the tape is prevented.

It is to be noted that while the foregoing description has been given of an example wherein the present invention is applied to a cassette type tape recorder of the automatic reversing type, the present invention is not in any means limited to the specific embodiment described above. For example, while the tape recorder of the embodiment described above is of the automatic reversing type and therefore includes a pair of tape guides located on opposite sides of a magnetic head for guiding a magentic tape for opposite directions in which the tape is fed, the present invention can be applied to a cassette type tape recorder of the one-way type wherein a tape guide may be provided only for the tape supply side of a head carrying plate with respect to a magnetic head, that is, only at a location upstream of a magnetic head along a feeding passage of a magnetic tape or else for each of the tape supply side and the tape winding side similarly as in the cassette type tape recorder of the embodiment described above.

Having now fully described the invention, it will be apparent to one of ordinary skill in the art that many changes and modifications can be made thereto without departing from the spirit and scope of the invention as set forth herein.

What is claimed is:

1. In a tape recorder of the cassette type which includes a stationary main base plate, a pair of cassette guide posts securely mounted at base ends thereof on said main base plate for receiving a tape cassette thereon, a head carrying plate mounted for movement toward and away from a tape cassette received in position on said cassette guide posts, a magnetic head mounted at a location of said head carrying plate between said cassette guide posts on said main base plate, and a tape guide mounted on said head carrying plate upstream of said head along a feeding passage of a magnetic tape in the tape cassette, said tape guide having a tape contacting face for contacting with the tape and a pair of upper and lower widthwise movement limiting portions formed adjacent upper and lower ends of said tape contacting face for limiting lateral widthwise movement of the tape being fed along said tape contacting face of said tape guide, the improvement wherein each of said upper and lower widthwise movement limiting portions has a top and a bottom face, each said top face being substantially parallel to said corresponding bottom face, and one of said cassette guide posts has a tapering profile presenting a lower large diameter portion and an upper small diameter portion while said upper widthwise movement limiting portion of said tape guide has a greater extension from said tape contacting face than said lower widthwise movement limiting portion, and said tape guide is located such that said upper widthwise movement limiting portion thereof is located opposite said small diameter portion of the one cassette guide post while said lower widthwise movement limiting portion thereof is located opposite said large diameter portion of the one cassette guide post and wherein the distance between said upper widthwise movement limiting portion of said tape guide and said small diameter portion of said one cassette guide post is substantially the same as the distance between said lower widthwise movement limiting portion of said tape guide and said large diameter portion of said one cassette guide post, whereby undersirable widthwise movement of said magnetic tape from within the confines of said upper and lower widthwise movement limiting portions of said tape guide is minimized.

2. A tape recorder as claimed in claim 1, wherein said large diameter portion of said tape guide has a cylindrical shape of a fixed diameter while said small diameter portion has a substantially conical shape with the diameter thereof reduced toward the other end of said guide post.

3. A tape recorder as claimed in claim 1, wherein the other of said cassette guide posts has a similar profile to the one cassette guide post, and further comprising a second tape guide having a similar profile to said first-mentioned tape guide and located on said head carrying plate downstream of said head along the feeding passage such that the upper widthwise movement limiting portion thereof opposes to the smaller diameter portion of the other cassette guide post while the lower widthwise movement limiting portion thereof opposes to the large diameter portion of the one cassette guide post.

4. A tape recorder as claimed in claim 1, wherein said upper and lower widthwise movement limiting portion extend substantially perpendicularly to the longitudinal axis of said corresponding cassette guide post.

* * * * *